United States Patent
Fujita et al.

(10) Patent No.: US 12,450,528 B2
(45) Date of Patent: Oct. 21, 2025

(54) WORK MANAGEMENT SYSTEM

(71) Applicant: HITACHI CONSTRUCTION MACHINERY CO., LTD., Tokyo (JP)

(72) Inventors: Tsuyoshi Fujita, Ibaraki (JP); Eiji Egawa, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/585,149

(22) Filed: Feb. 23, 2024

(65) Prior Publication Data
US 2024/0193500 A1     Jun. 13, 2024

Related U.S. Application Data

(63) Continuation of application No. 17/436,461, filed as application No. PCT/JP2020/030535 on Aug. 11, 2020, now abandoned.

(30) Foreign Application Priority Data

Sep. 30, 2019  (JP) .................................. 2019-178197

(51) Int. Cl.
  *G06Q 10/063*    (2023.01)
  *G01G 19/08*    (2006.01)
  (Continued)

(52) U.S. Cl.
  CPC ........... *G06Q 10/063* (2013.01); *G01G 19/08* (2013.01); *G06Q 50/08* (2013.01); *G16Y 10/30* (2020.01); *G16Y 20/10* (2020.01); *G16Y 40/60* (2020.01)

(58) Field of Classification Search
  CPC ...... G06Q 10/063; G06Q 10/06; G01G 19/08; G01G 19/00
  See application file for complete search history.

(56) References Cited

U.S. PATENT DOCUMENTS

2009/0088961 A1   4/2009  Morey et al.
2009/0154992 A1   6/2009  Greiner et al.
(Continued)

FOREIGN PATENT DOCUMENTS

CN   109844231 A   6/2019
JP   2001-163405 A   6/2001
(Continued)

OTHER PUBLICATIONS

Extended European Search Report received in corresponding European Application No. 20872023.5 dated Sep. 28, 2022.
(Continued)

*Primary Examiner* — William S Brockington, III
(74) *Attorney, Agent, or Firm* — MATTINGLY & MALUR, PC (57) ABSTRACT

The present disclosure provides a construction management system capable of ascertaining information about a construction site more accurately than before. A construction management system 100 comprises: a position sensor 16a detecting position information about a transport vehicle 10 that transports payload; a position sensor 26 detecting position information about a loading machine 20 that loads payload onto the transport vehicle 10; a weight detection device 120 detecting weight information about the payload held by the loading machine 20; and an information management controller 130 which, based on chronological information of the position information about the transport vehicle 10, chronological information of the position information about the loading machine, and chronological information of the weight information, calculates the load weight of the payload loaded onto the transport vehicle 10.

5 Claims, 8 Drawing Sheets

(51) Int. Cl.
*G06Q 50/08* (2012.01)
*G16Y 10/30* (2020.01)
*G16Y 20/10* (2020.01)
*G16Y 40/60* (2020.01)

(56) References Cited

U.S. PATENT DOCUMENTS

| | | | |
|---|---|---|---|
| 2009/0216410 A1* | 8/2009 | Allen | G05D 1/0278 |
| | | | 701/50 |
| 2014/0088820 A1 | 3/2014 | Jericho et al. | |
| 2015/0159613 A1 | 6/2015 | Jensen et al. | |
| 2016/0225106 A1 | 8/2016 | Shike | |
| 2016/0247395 A1 | 8/2016 | Sugihara et al. | |
| 2016/0292619 A1 | 10/2016 | Mendiola et al. | |
| 2018/0179732 A1 | 6/2018 | Bartsch et al. | |
| 2019/0180627 A1 | 6/2019 | Talmaki et al. | |
| 2019/0370725 A1 | 12/2019 | Ha et al. | |
| 2020/0041329 A1 | 2/2020 | Shike | |
| 2020/0173791 A1 | 6/2020 | Misaki | |
| 2020/0299929 A1 | 9/2020 | Ohiwa et al. | |
| 2020/0327336 A1* | 10/2020 | Seki | E02F 9/26 |

FOREIGN PATENT DOCUMENTS

| | | |
|---|---|---|
| JP | 2009-235819 A | 10/2009 |
| JP | 2017-123113 A | 7/2017 |
| JP | 6199449 B2 | 9/2017 |
| KR | 10-0923255 B1 | 10/2009 |
| KR | 10-2018-0092689 A | 8/2018 |
| WO | 2015/156018 A1 | 10/2015 |
| WO | 2017/221904 A1 | 12/2017 |
| WO | 2018/124144 A1 | 7/2018 |
| WO | 2019/031551 A1 | 2/2019 |

OTHER PUBLICATIONS

International Search Report of PCT/JP2020/030535 dated Oct. 27, 2020.
Chinese Office Action received in corresponding Chinese Application No. 202080018696.4 dated Jan. 22, 2024.
Korean Office Action received in corresponding Korean Application No. 10-2021-7028849 dated Apr. 5, 2024.

* cited by examiner

Operation daily report

| Site name | ... | | | |
|---|---|---|---|---|
| Daily report date | YYYY | MM | DD | |
| Work contents | ... | | | |

| Details of transport amount | | | | |
|---|---|---|---|---|
| Loading site | Collection site | Number of transport vehicles | Transport amount [t] | Transport amount [m³] |
| Loading site 1 | Collection site 1 | 3 | 6.0 | 4.3 |
| Loading site 2 | Collection site 2 | 3 | 6.0 | 4.3 |
| Loading site 3 | Collection site 3 | 3 | 6.0 | 4.3 |
| ... | ... | ... | ... | ... |
| ... | ... | ... | ... | ... |

| Set value | | |
|---|---|---|
| Load amount [t] | Specific gravity [t/m³] | Unit cost [¥/m³] |
| 2.0 | 1.4 | 100 |

| Total | | | |
|---|---|---|---|
| Number of transport vehicles | Transport amount [t] | Transport amount [m³] | Transport fee [¥] |
| 9 | 18 | 12.9 | 1286 |

WORK MANAGEMENT SYSTEM

TECHNICAL FIELD

The present disclosure relates to a construction management system.

BACKGROUND ART

Conventionally, a construction management system is known which is provided with an emitter, a portable terminal, a receiving unit, a detecting unit, a specific data acquiring unit, and a work managing unit (see claim 1 of Patent Literature 1 indicated below, for example). The emitter is disposed on a transport vehicle and emits radio waves including specific data of the transport vehicle. The portable terminal is disposed on a loading machine. The receiving unit is provided in the portable terminal and receives the radio waves from the emitter.

The detecting unit is provided in the portable terminal and detects the intensity of the radio waves received by the receiving unit. The specific data acquiring unit is provided in the portable terminal and acquires the specific data from the radio waves received by the receiving unit. The work managing unit generates actual performance data indicating that the transport vehicle has approached the loading machine, based on the intensity detected by the detecting unit and the specific data acquired by the specific data acquiring unit.

Further, the work managing unit determines that the loading machine is performing a loading work for loading a load onto the transport vehicle if the intensity of the radio waves received by the receiving unit is a value greater than or equal to a threshold value (see claim 3 of the literature, for example). Further, the work managing unit determines that the transport vehicle has started a transport work for transporting the load if the intensity of the radio waves received by the receiving unit has changed from a value greater than or equal to the threshold value to a value lower than the threshold value (see claim 4 of the literature, for example).

CITATION LIST

Patent Literature

Patent Literature 1: WO 2015/156018

SUMMARY OF INVENTION

Technical Problem

The conventional construction system, by utilizing a change in the intensity of the radio waves received by the receiving unit in accordance with the distance from the emitter, makes a determination for implementing the loading work and a determination for starting the transport work based on a threshold value of the intensity of the radio waves (see claims 3-4 and paragraph 0022, for example, of the patent literature). Further, the total amount of load transported from the construction site is calculated based on the maximum payload capacity data of the transport vehicle and at least one of data on the number of times of approach and data on the number of withdrawals (see paragraph 0084 of the patent literature, for example). However, even when the loading machine and the transport vehicle have approached each other and the intensity of the radio waves has become greater than or equal to the threshold value, no loading work may be actually implemented. This leads to the problem that the total amount of load transported from the construction site cannot be accurately ascertained.

The present disclosure provides a construction management system with which it is possible to ascertain information about a construction site more accurately than before.

Solution to Problem

According to an embodiment of the present disclosure, a construction management system includes a transport vehicle position detection device which detects position information about a transport vehicle for transporting a payload, a loading machine position detection device which detects position information about a loading machine for loading the payload onto the transport vehicle, a weight detection device which detects weight information about the payload held by the loading machine, and an information management controller which, based on chronological information of the position information about the transport vehicle, chronological information of the position information about the loading machine, and chronological information of the weight information, calculates a load weight of the payload loaded onto the transport vehicle.

Advantageous Effects of Invention

According to the present disclosure, it is possible to provide a construction management system capable of ascertaining information about a construction site more accurately than before.

DESCRIPTION OF EMBODIMENTS

In the following, an embodiment of a construction management system of the present disclosure will be described with reference to the drawings.

Figure 1:
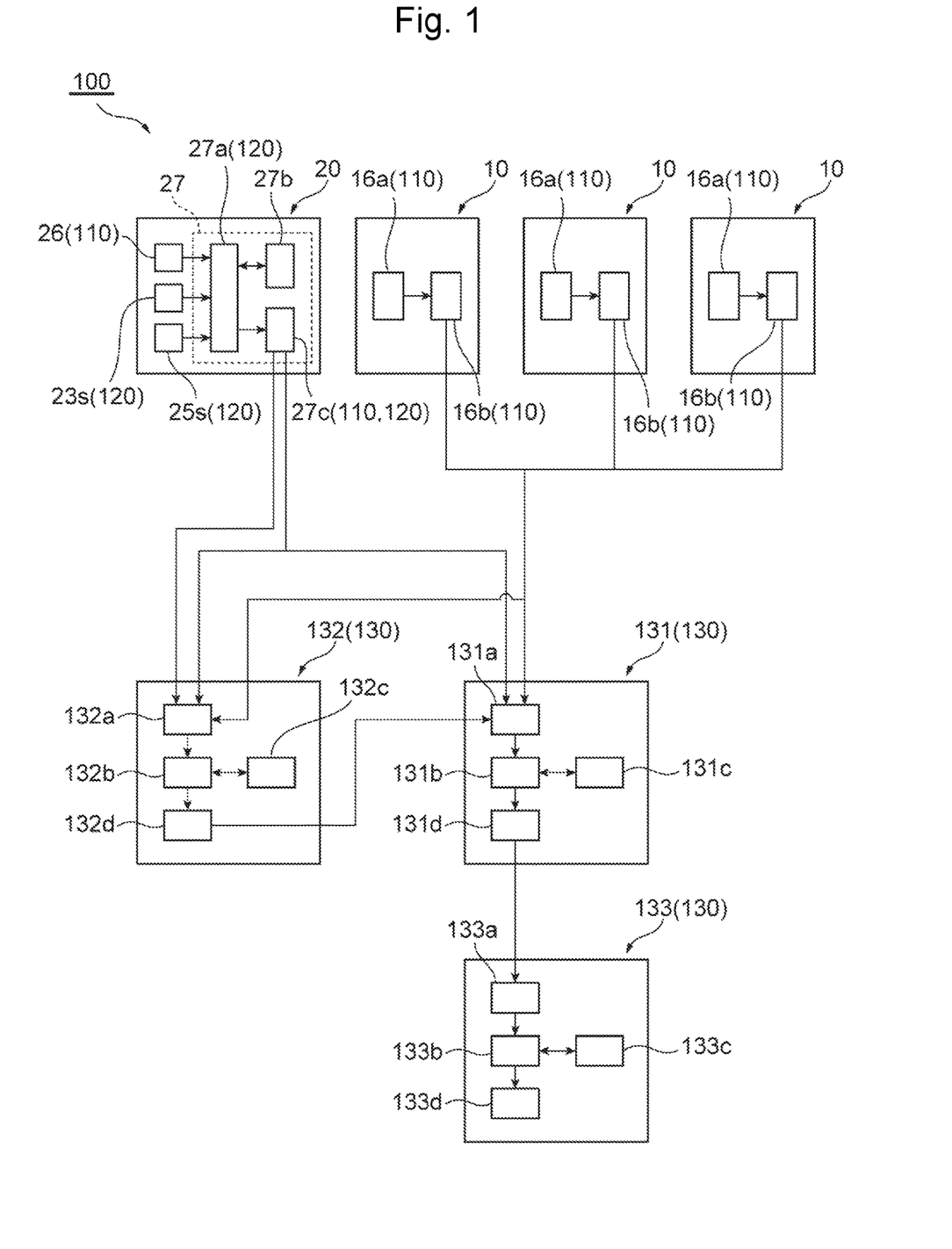
FIG. 1 is a schematic block diagram illustrating an embodiment of a construction management system of the present disclosure.

FIG. 1 is a schematic block diagram illustrating an embodiment of the construction management system of the present disclosure. A construction management system 100 of the present embodiment is a system that constitutes an Internet of Things (IOT) construction solution utilizing a mobile terminal, such as a smartphone, at a construction site, for example. The construction management system 100 of the present embodiment realizes a site where machinery and humans are connected by IoT technology, and contributes to improvements in productivity and safety.

While the details will be described later, the construction management system 100 of the present embodiment have the following major features. The construction management system 100 is provided with a position detection module 110, a weight detection device 120, and an information management controller 130. The position detection module 110 includes a position sensor 16a as a transport vehicle position detection device for detecting position information about a transport vehicle 10 that transports a payload, and a position sensor 26 as a loading machine position detection device for detecting position information about a loading machine 20 that loads a payload onto the transport vehicle 10. The weight detection device 120 detects weight information about a payload held by the loading machine 20. The information management controller 130 calculates the load weight of the payload loaded onto the transport vehicle 10, based on chronological information of the position information about the transport vehicle 10, chronological information of the position information about the loading machine 20, and chronological information of the weight information. In the following, the configuration of the elements of the construction management system 100 of the present embodiment will be described in detail.

In FIG. 1, as an example, three transport vehicles 10 and one loading machine 20 are illustrated. However, the number of the transport vehicles 10 and loading the number of the machines 20 are not particularly limited. That is, the construction management system 100 may implement construction management for one or a plurality of transport vehicles 10 and one or a plurality of loading machines 20.

Figure 2:
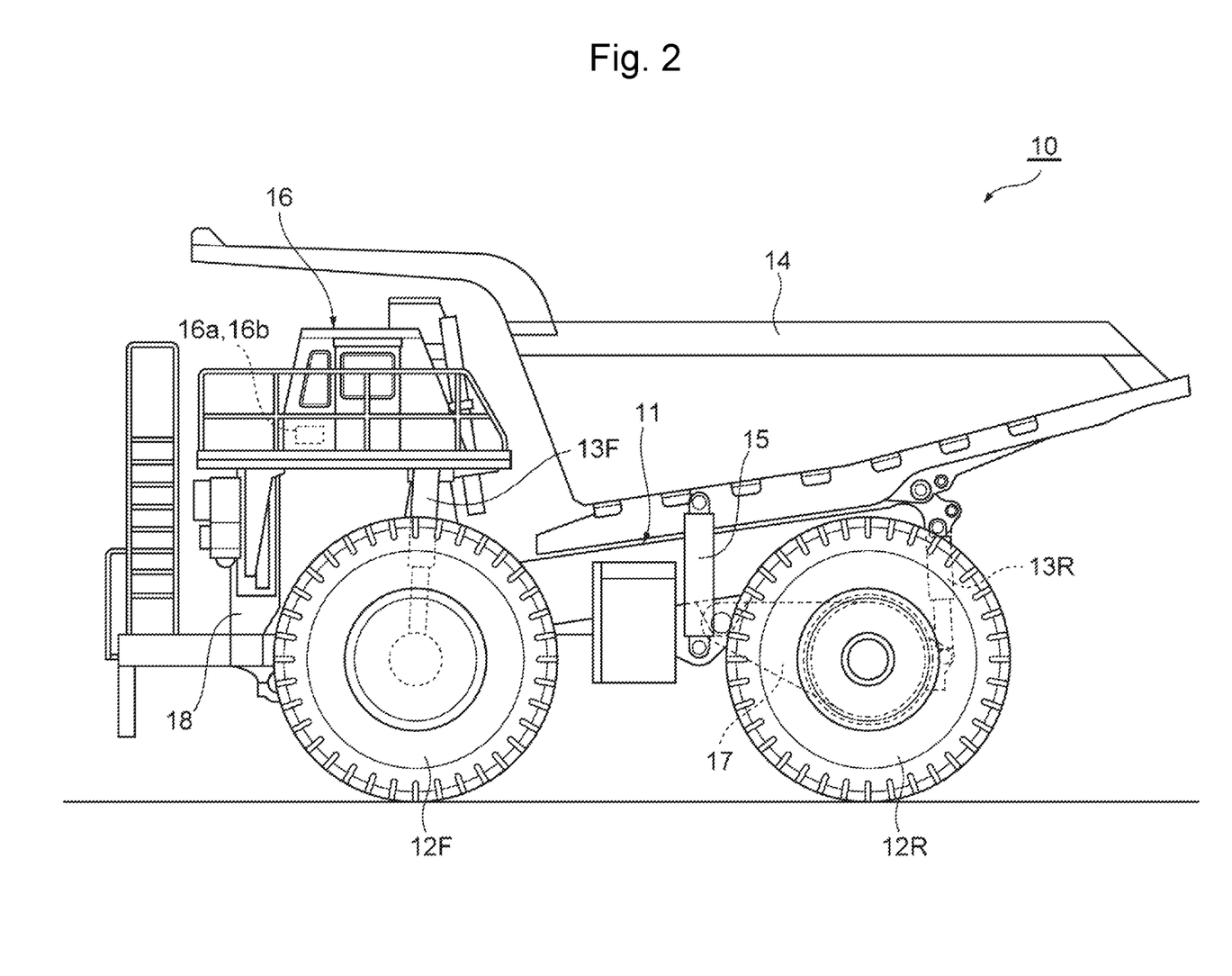
FIG. 2 is a side view illustrating an example of a transport vehicle of FIG. 1.

FIG. 2 is a side view illustrating an example of the transport vehicles 10 of FIG. 1. The transport vehicle 10 is a dump truck, for example. The transport vehicle 10 has a vehicle body frame 11, left and right front wheels 12F, left and right rear wheels 12R, left and right front wheel-side suspension devices 13F, left and right rear wheel-side suspension devices 13R, a bed 14, left and right hoist cylinders 15, a cab 16, a travel drive device 17, and a housing 18, for example. The payload which is loaded onto the bed 14 of the transport vehicle 10 by the loading machine 20 is not particularly limited. Examples are earth, crushed rock, and mineral resources.

As illustrated in FIG. 1, each transport vehicle 10 may be provided with a position sensor 16a for detecting the position of each transport vehicle 10 using the Global Navigation Satellite System (GNSS), for example, and a communication device 16b for transmitting the position information output from the position sensor 16a to the information management controller 130. The position sensor 16a and the communication device 16b need not be necessarily installed on the transport vehicle 10, and may instead be mounted on a mobile terminal, such as a smartphone, carried by an operator riding in the cab 16 of the transport vehicle 10.

Figure 3:
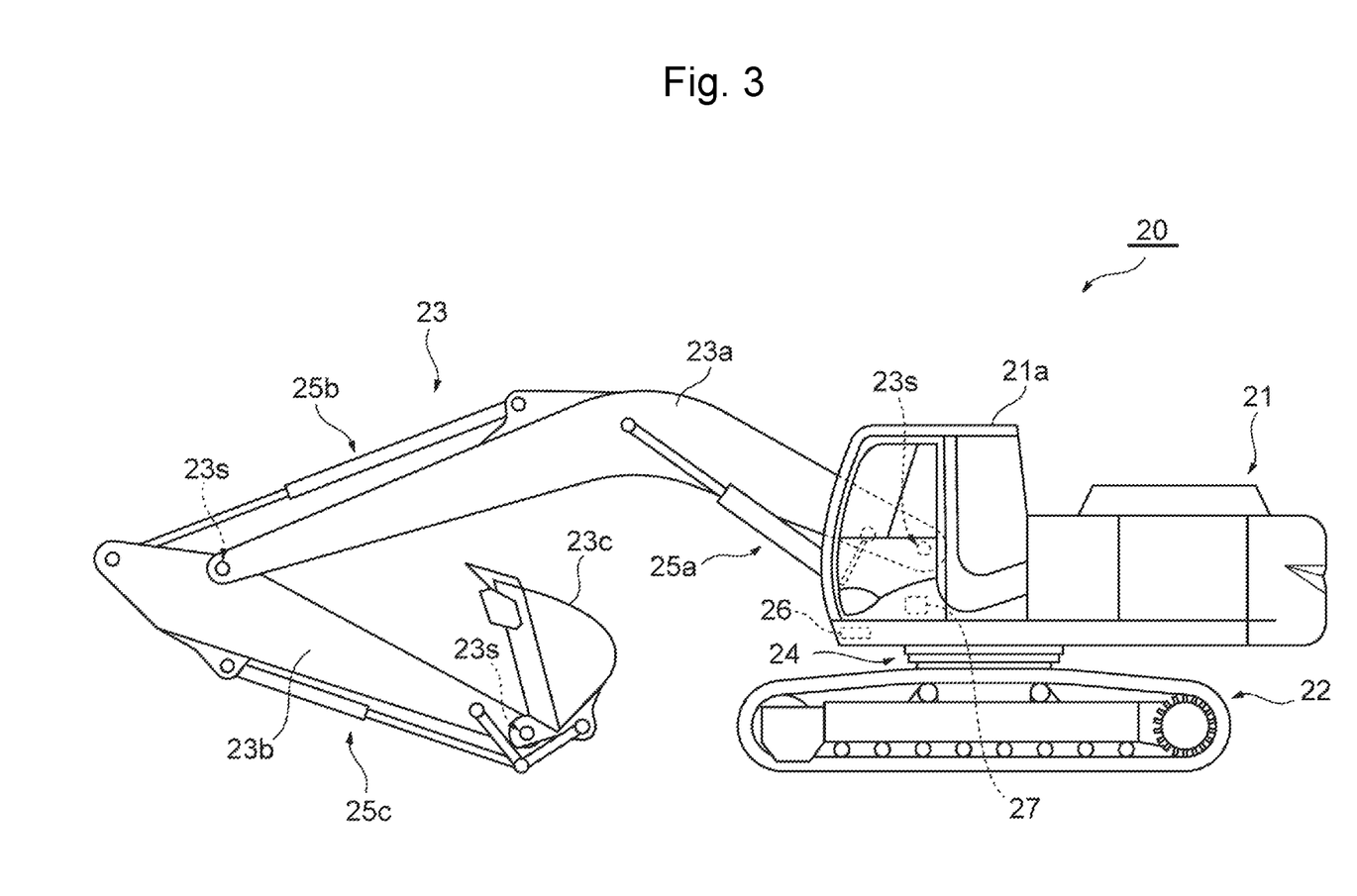
FIG. 3 is a side view illustrating an example of a loading machine of FIG. 1.

FIG. 3 is a side view illustrating an example of the loading machine 20 of FIG. 1. The loading machine 20 is a hydraulic excavator, for example. The loading machine 20 is provided with, for example, an upper slewing structure 21, a lower travel structure 22, a work assembly 23, attitude sensors 23s for determining the attitude of the work assembly 23, a slewing mechanism 24, hydraulic cylinders 25a, 25b, 25c, a position sensor 26, a control unit 27, and a hydraulic device which is not shown. The loading machine 20 is not limited to a hydraulic excavator and may include other work machines, such as a wheel loader and a crane.

The work assembly 23 is provided in front of the upper slewing structure 21, for example, and is driven by the hydraulic cylinders 25a, 25b, 25c to perform work, such as an excavation work or a loading work. The work assembly 23 includes a boom 23a, an arm 23b, and a bucket 23c, for example. The boom 23a is pivotally supported on the upper slewing structure 21 via a boom pin. The arm 23b is supported movably with respect to the boom 23a via an arm pin. The bucket 23c is supported pivotally with respect to the arm 23b via a bucket pin.

The attitude sensors 23s are angle sensors provided for each of the boom pin, the arm pin, and the bucket pin, for example. The attitude sensors 23s, for example, detect a rotational angle of the boom 23a relative to the upper slewing structure 21, a rotational angle of the arm 23b relative to the boom 23a, and a rotational angle of the bucket 23c relative to the arm 23b. The attitude sensors 23s are not limited to angle sensors. For example, other sensors capable of detecting the attitude of the work assembly 23, such as an acceleration sensor and a gyro sensor, may be used as the attitude sensors 23s.

While not illustrated in FIG. 3, the hydraulic cylinders 25a, 25b, 25c are each provided with a hydraulic sensor 25s (see FIG. 1) for measuring an oil pressure in the cylinder tube. The hydraulic sensor 25s may be provided at least for the hydraulic cylinder 25a driving the boom 23a relative to the upper slewing structure 21, and may not be provided for the other hydraulic cylinders 25b, 25c. The hydraulic sensor 25s, for example, measures the oil pressure in the cylinder tubes of the hydraulic cylinders 25a, 25b, 25c, and outputs hydraulic information corresponding to the measured oil pressure to the control unit 27.

The position sensor 26 is configured using GNSS or the like, and detects the position of each loading machine 20. The control unit 27 is composed of, for example, a microcontroller or firmware installed on the loading machine 20, and is provided with a processing device 27a such as a CPU, a storage device 27b such as a RAM and a hard disk, and a communication device 27c for transmitting information to the outside. The position sensor 26 and the control unit 27 need not be necessarily installed on the loading machine 20, and may be mounted on, for example, a mobile terminal, such as a smartphone, carried by an operator riding in a cab 21a of the loading machine 20.

The processing device 27a receives an input of position information about the loading machine 20 output from the position sensor 26, via a wireless communication line or a wired communication line. The processing device 27a also receives an input of information about the attitude of the work assembly 23 output from the attitude sensors 23s and hydraulic information output from the hydraulic sensor 25s, via a wireless communication line or a wired communication line. The processing device 27a processes the input information and causes the information to be stored in the storage device 27b on a predetermined periodic basis.

The storage device 27b stores chronological information of the information input from the processing device 27a, a computer program, data, and other information, for example. The communication device 27c, for example, transmits the information input from the processing device 27a to the information management controller 130 via a wireless communication line.

Further, the processing device 27a may be configured to calculate the weight of a payload held by the work assembly 23, based on the attitude of the work assembly 23 measured by the attitude sensors 23s and the oil pressure measured by the hydraulic sensor 25s, for example. More specifically, for example, in order to load payload onto the bed 14 of the transport vehicle 10 using the loading machine 20, the work assembly 23 is driven by the hydraulic cylinders 25a, 25b, 25c and payload on the ground is scooped up by the bucket 23c of the work assembly 23.

At this time, the processing device 27a, for example, executes the computer program stored in the storage device 27b and, based on the information about the attitude of the work assembly 23 input from the attitude sensors 23s and the hydraulic information input from the hydraulic sensor 25s, calculates the weight of the payload collected in the bucket 23c of the work assembly 23. Calculation of the weight of the payload may be performed by the information management controller 130 as will be described later.

The position detection module 110, as mentioned above, detects position information about each transport vehicle 10 that transports payload, and position information about the loading machine 20 that loads payload onto the transport vehicle 10. The position detection module 110 includes the position sensor 16a (transport vehicle position detection device) and the communication device 16b mounted on the transport vehicle 10, and the position sensor 26 (loading machine position detection device) and the communication device 27c mounted on the loading machine 20, for example.

The position sensor 16a mounted on the transport vehicle 10 detects the position of the transport vehicle 10 on a predetermined periodic basis, and outputs position information about the transport vehicle 10 including the detected position and the time of detection of the position to the communication device 16b. The communication device 16b transmits the position information input from the position sensor 16a to the information management controller 130 via a wireless communication line, for example.

Similarly, the position sensor 26 mounted on the loading machine 20 detects the position of the loading machine 20 on a predetermined periodic basis, and outputs position information about the loading machine 20 including the detected position and the time of detection of the position to the control unit 27. The communication device 27c of the control unit 27 transmits the position information about the loading machine 20 that has been input from the position sensor 26 via the processing device 27a, to the information management controller 130 via a wireless communication line, for example.

The weight detection device 120, as mentioned above, detects weight information about the payload held by the loading machine 20. The weight detection device 120, for example, includes the hydraulic sensor 25s, the attitude sensors 23s, the processing device 27a, and the communication device 27c of the loading machine 20.

The hydraulic sensor 25s of the loading machine 20, for example, detects the oil pressure in the cylinder tube of the hydraulic cylinder 25a on a predetermined periodic basis, and outputs hydraulic information including the oil pressure and the time of detection of the oil pressure to the processing device 27a. The attitude sensors 23s of the loading machine 20, for example, sense the attitude of the work assembly 23, including the angle of the boom 23a relative to the upper slewing structure 21, the angle of the arm 23b relative to the boom 23a, and the angle of the bucket 23c relative to the arm 23b on a predetermined periodic basis. The attitude sensors 23s then outputs attitude information including the attitude and the time of sensing of the attitude to the processing device 27a.

The processing device 27a calculates the weight of the payload held by the work assembly 23, based on the hydraulic information and the attitude information input from the hydraulic sensor 25s and the attitude sensors 23s. More specifically, the storage device 27b, for example, stores dimension information about various parts of the work assembly 23 and a computer program for computing the weight of the payload held by the work assembly 23 based on the dimensions and attitudes of the various parts of the work assembly 23 and the oil pressure of the hydraulic cylinder 25a.

The processing device 27a executes the program stored in the storage device 27b and, based on the dimension information, attitude information, and hydraulic information described above, calculates the weight of the payload collected in the bucket 23c and held by the work assembly 23. The processing device 27a further outputs weight information including the calculated weight and the time of detection of the weight to the communication device 27c. The communication device 27c transmits the weight information input from the processing device 27a to the information management controller 130 via a wireless communication line, for example.

The information management controller 130, as mentioned above, calculates the load weight of the payload of each transport vehicle 10, based on chronological information of the position information about the transport vehicle 10, chronological information of the position information about the loading machine 20, and chronological information of the weight information about the payload held by the work assembly 23 of the loading machine 20. The information management controller 130, for example, includes a position information server 131, a weight information server 132, and a user server 133.

The weight information server 132, for example, receives the weight information transmitted from the communication device 27c of each loading machine 20. The weight information server 132, for example, is provided with a receiving device 132a, a processing device 132b, a storage device 132c, and a transmitting device 132d.

The receiving device 132a, for example, receives the weight information transmitted from the communication device 27c of the loading machine 20, and outputs the weight information to the processing device 132b. The processing device 132b, for example, causes the weight information input from the receiving device 132a to be stored in the storage device 132c as chronological information. Further, the processing device 132b, for example, reads the chronological information of the weight information stored in the storage device 132c, and outputs the chronological information to the transmitting device 132d. The transmitting device 132d transmits the chronological information of the weight data input from the processing device 132b to the position information server 131 via a wireless communication line or a wired communication line, for example.

The control unit 27 mounted on each loading machine 20 may not calculate the weight of the payload held by the work assembly 23 of the loading machine 20. In this case, the processing device 27a of the control unit 27 mounted on each loading machine 20 outputs the attitude information and hydraulic information that are based on the attitude and oil pressure comprising the inputs from the attitude sensors 23s and the hydraulic sensor 25s, to the communication device 27c. The communication device 27c outputs the attitude information and hydraulic information input from the processing device 27a to the weight information server 132 of the information management controller 130.

In this case, for example, the weight information server 132 may be configured to detect the weight information about the payload held by the work assembly 23 of each loading machine 20, based on the attitude information and hydraulic information received from the communication device 27c of each loading machine 20. Specifically, for example, the receiving device 132a of the weight information server 132 receives the attitude information and weight information transmitted from the communication device 27c of the loading machine 20, and outputs the attitude information and weight information to the processing device 132b.

The processing device 132b, based on the attitude information and weight information input from the receiving device 132a, calculates the weight of the payload held by the work assembly 23 of each loading machine 20. Further, the processing device 132b causes weight information including the calculated weight and the time of detection of the weight to be stored in the storage device 132c as chronological information. Also, the processing device 132b reads the chronological information of the weight information stored in the storage device 132c, and outputs the chronological information to the transmitting device 132d. The transmitting device 132d transmits the chronological information of the weight information input from the processing device 132b to the position information server 131.

The position information server 131 receives from the position detection module 110 position information about the transport vehicles 10 and position information about the loading machine 20. More specifically, the position information server 131 includes a receiving device 131a, a processing device 131b, a storage device 131c, and a transmitting device 131d, for example.

The receiving device 131a receives the position information about each transport vehicle 10 transmitted from the communication device 16b of each transport vehicle 10, and also receives the position information about each loading machine 20 transmitted from the communication device 27c of each loading machine 20. Further, the receiving device 131a receives from the weight information server 132 the weight data of the payload held by the work assembly 23 of each loading machine 20, for example. Further, the receiving device 131a outputs the received information to the processing device 131b.

The processing device 131b processes the information input from the processing device 131b and causes the resultant information to be stored in the storage device 131c as chronological information. The storage device 131c stores, for example, threshold values of distances between the loading machine 20 and the transport vehicles 10 at which the loading machine 20 can load payload onto the bed 14 of the transport vehicles 10 using the work assembly 23. Further, the processing device 131b, for example, calculates the weight of the payload loaded onto each transport vehicle 10, i.e., the load weight of the transport vehicle 10, based on the chronological information of the position information about each transport vehicle 10, the chronological information of the position information about each loading machine 20, and the chronological information of the weight information about the payload held by each loading machine 20 stored in the storage device 131c.

In addition, the processing device 131b causes the calculated weight of the payload of each transport vehicle 10 to be stored in the storage device 132c as load weight information. Further, the processing device 131b reads the position information and load weight information about each transport vehicle 10 stored in the storage device 131c, and outputs the information to the transmitting device 131d. The transmitting device 131d transmits the information input from the processing device 131b to the user server 133, for example.

The user server 133 creates an operation daily report based on the information received from the position information server 131, for example. The user server 133 is provided with a receiving device 133a, a processing device 133b, a storage device 133c, and an output device 133d, for example.

The receiving device 133a receives the information transmitted from the transmitting device 131d of the position information server 131 and outputs the information to the processing device 133b. The processing device 133b causes the information input from the receiving device 133a to be stored in the storage device 133c. In an example, the processing device 133b may, based on the chronological information of the position information about the transport vehicle 10, the chronological information of the position information about the loading machine 20, and the chronological information of the weight information stored in the storage device 133c, calculate the load weight of the payload loaded onto each transport vehicle 10 and cause the load weight to be stored in the storage device 133c. Further, the processing device 133b, based on the information stored in the storage device 133c, calculates operation daily report data and outputs the data to the output device 133d.

More specifically, the storage device 133c, for example, stores position information about a collection site where the payload transported by the transport vehicle 10 is unloaded or dumped. The processing device 133b, for example, based on the position information about the collection site and the chronological information of the position information about each transport vehicle 10 as well as the load weight information thereof, calculates, as operation daily report data, an integrated value of the weight of the payload that each transport vehicle 10 unloaded in the collection site. Further, the processing device 133b, for example, based on the position information about the collection site, the chronological information of the position information about each transport vehicle 10, and the load weight information, calculates, as operation daily report data, the travelling time of the transport vehicle 10 from a loading position where the payload was loaded onto each transport vehicle 10 to the collection site.

In addition, the processing device 133b, for example, based on the position information about the collection site and the chronological information of the position information about each transport vehicle 10 as well as the load weight thereof, calculates, as operation daily report data, the number of times of movement of each transport vehicle 10 from the loading position where the payload was loaded onto the transport vehicle 10 to the collection site. Further, the processing device 133b, for example, based on the position information about each collection site and the chronological information of the position information about each transport vehicle 10 as well as the load weight information thereof, calculates, as operation daily report data, an operating time at each collection site, the number of times of movement of the transport vehicle 10 from the loading position where the payload was loaded onto each transport vehicle 10 to each collection site, and a total weight of the payload unloaded at each collection site.

The processing device 133b causes the calculated operation daily report data to be stored in the storage device 133c, and also outputs the data to the output device 133d. The output device 133d includes a display device and software or a printer, for example. The display device outputs, in the form of an image, an operation daily report based on the operation daily report data input from the processing device 133b. The operation daily report may be output in the form of an electronic file by the software, or may be printed on paper and output by the printer.

Figure 4:
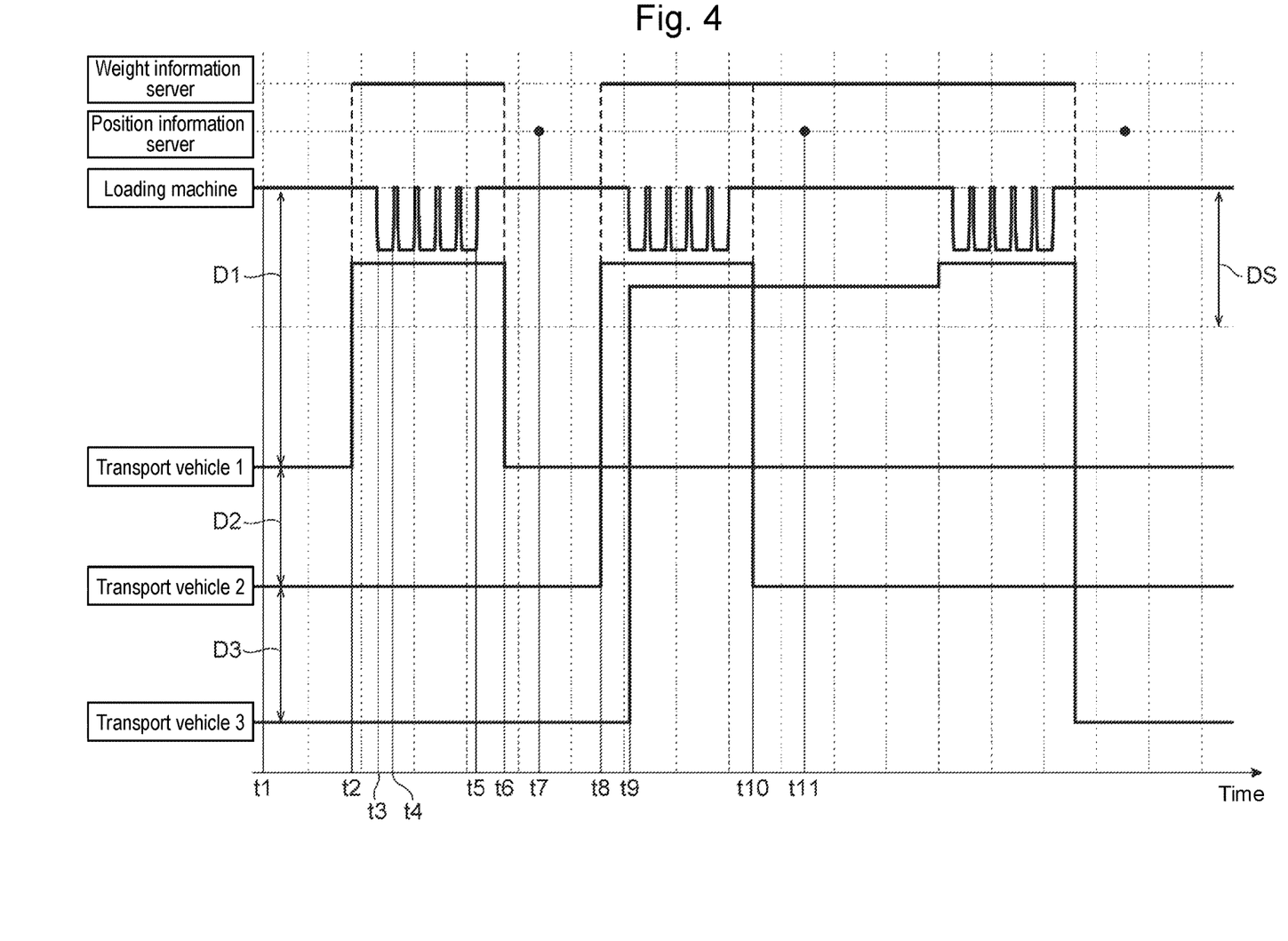
FIG. 4 is a time chart illustrating the operation of a position information server and a weight information server of FIG. 1.
Figure 5:
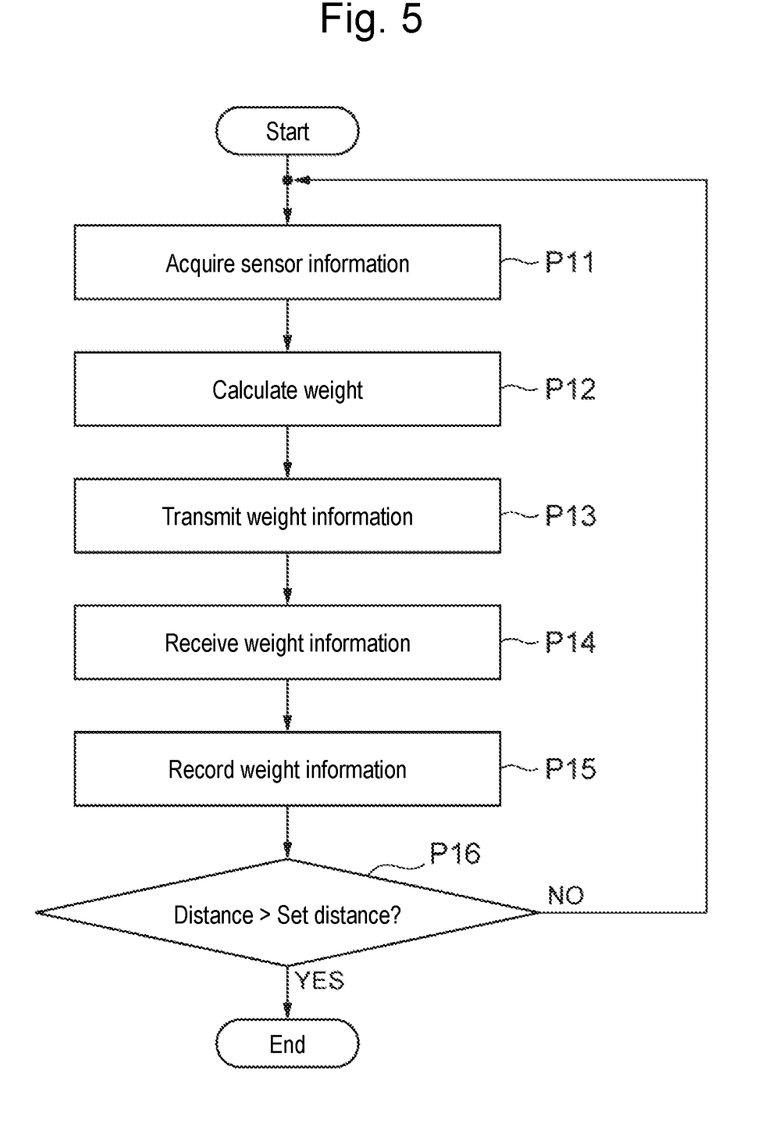
FIG. 5 is a flowchart showing the flow of processing of the weight information server of FIG. 1.

In the following, with reference to FIG. 4 to FIG. 8, operation of the construction management system 100 of the present embodiment is described. FIG. 4 shows a time chart illustrating an example of the operation of the construction management system 100 of FIG. 1. FIG. 5 shows a flowchart illustrating the flow of a process of the weight detection device 120 included in the construction management system 100 of FIG. 1.

In FIG. 4, the temporal changes in the distance between one loading machine 20 and the three transport vehicles 10 are indicated by the interval between straight lines. For instance, at time t1, the distance between the loading machine 20 and the transport vehicle 10 closest to the loading machine 20 is D1. Further, at time t1, the distance between the transport vehicle 10 closest to the loading machine 20 and the transport vehicle 10 second closest to the loading machine 20 is D2. Further, the distance between the transport vehicle 10 second closest to the loading machine 20 and the transport vehicle 10 third closest to the loading machine 20 is D3.

Moreover, FIG. 4 shows a threshold value DS of a distance between the loading machine 20 and the transport vehicles 10 at which the loading machine 20, using the work assembly 23, can load the payload onto the bed 14 of the transport vehicles 10. In addition, FIG. 4 shows the timing of operation of the position information server 131 and the weight information server 132 of the information management controller 130.

In the example illustrated in FIG. 4, at time t1, the distances (D1, D1+D2, D1+D2+D3) between one loading machine 20 and the three transport vehicles 10 are greater than the threshold value DS. In this case, the construction management system 100, for example, does not start the process illustrated in FIG. 5 until the distance between at least one loading machine 20 and at least one transport vehicle 10 becomes less than or equal to the threshold value DS. For example, at time t2, when the distance between one loading machine 20 and one transport vehicle 10 becomes less than or equal to the threshold value DS, the construction management system 100 starts the process illustrated in FIG. 5.

As illustrated in FIG. 5, the construction management system 100 initially performs a process P11 for acquiring sensor information. In the process P11, the construction management system 100 detects and acquires, using the position detection module 110 described above, the position information about each transport vehicle 10 and the position information about each loading machine 20. Further, the construction management system 100, using the weight detection device 120 described above, detects and acquires the weight information about the payload held by each loading machine 20.

More specifically, in the process P11, the position detection module 110 detects, using the position sensor 16a, which is the transport vehicle position detection device, the position information about each transport vehicle 10, and also detects, using the position sensor 26, which is the loading machine position detection device, the position information about the loading machine 20. The position information about the transport vehicle 10 and the position information about the loading machine 20 detected by the position sensor 16a and the position sensor 26 are transmitted by the communication device 27c to the information management controller 130.

Also, in the process P11, the weight detection device 120 measures, using the hydraulic sensor 25s of the loading machine 20, the oil pressure of the hydraulic cylinder 25a that drives the work assembly 23, and also detects, using the attitude sensors 23s of the loading machine 20, the attitude of the work assembly 23. When the weight of the payload held by the work assembly 23 is calculated by the information management controller 130, the information about oil pressure and attitude detected by the hydraulic sensor 25s and attitude sensors 23s, i.e., the hydraulic information and the attitude information are transmitted by the communication device 27c to the information management controller 130. After the end of the process P11, the construction management system 100 performs a process P12 for calculating the weight of the payload held by the work assembly 23 of the loading machine 20.

In the process P12, the weight detection device 120, for example, using the processing device 27a of the control unit 27 mounted on the loading machine 20, calculates the weight of the payload held by the work assembly 23, based on the information about the oil pressure and attitude detected by the hydraulic sensor 25s and the attitude sensors 23s, i.e., the hydraulic information and the attitude information. After the end of the process P12, the construction management system 100 performs a process P13 for transmitting information about the calculated weight, i.e., the weight information.

In the process P13, the communication device 27c of the control unit 27 mounted on the loading machine 20, for example, transmits the weight information calculated by the processing device 27a to the information management controller 130. Then, the weight information server 132 of the information management controller 130 performs a process P14 for receiving the weight information, using the receiving device 132a. Then, the weight information server 132 performs a process P15 for recording the weight information in the storage device 132c, using the processing device 132b.

The process P12 for calculating the weight of the payload held by the work assembly 23 may be performed by, for example, the processing device 132b of the weight information server 132. In this case, the processing device 132b of the weight information server 132, based on the hydraulic information and attitude information transmitted from the communication device 27c of the loading machine 20 and received by the receiving device 132a, calculates the weight of the payload held by the work assembly 23. In this case, the process P13 for transmitting the weight information and the process P14 for receiving the weight information are omitted, and the process P15 for recording the weight information calculated by the processing device 132b in the process P12 in the storage device 132c is performed.

Then, the weight information server 132, for example, performs the process P16 for determining whether the distance between the loading machine 20 and the transport vehicle 10 closest to the loading machine 20 is greater than the threshold value DS. In the process P16, the weight information server 132, for example, based on the position information about the transport vehicle 10 and the position information about the loading machine 20 received via the receiving device 132a, calculates, using the processing device 132b, the distance between the loading machine 20 and the transport vehicle 10 closest to the loading machine 20.

Further, in the process P16, the processing device 132b compares the calculated distance and the threshold value DS, and if the calculated distance is greater than the threshold value DS (YES), the construction management system 100 ends the process illustrated in FIG. 5. On the other hand, if the calculated distance is less than or equal to the threshold value DS (NO), the construction management system 100 repeatedly performs the process P11 to the process P16 on a predetermined periodic basis, and records the weight information about the payload held by the loading machine 20 in the storage device 132c of the weight information server 132 on a predetermined periodic basis.

In the example illustrated in FIG. 4, the loading machine 20, before time t3, for example, is in a state in which the payload has been scooped up by the bucket 23c of the work assembly 23 and is being held by the work assembly 23. After time t3, the loading machine 20 moves toward the transport vehicle 10 so that the distance between the loading machine 20 and the transport vehicle 10 is the shortest. Then, between time t3 and time t4, the loading machine 20, for example, dumps the payload in the bucket 23c of the work assembly 23 onto the bed 14 of the nearest transport vehicle 10, thus loading the payload onto the transport vehicle 10.

Further, between time t4 and time t5, the loading machine 20 repeatedly performs, a plurality of times, the work of moving a little away from the transport vehicle 10, scooping up the payload using the bucket 23c of the work assembly 23, again approaching the transport vehicle 10, and loading the payload in the work assembly 23 onto the bed 14 of the transport vehicle 10. At this time, the construction management system 100 repeatedly performs the process P11 to the process P16 described above, wherein the weight information about the payload held by the work assembly 23 is transmitted from the loading machine 20 to the weight information server 132, and the chronological information of the weight information is stored in the storage device 132c.

Thereafter, at time t6, the transport vehicle 10 with the payload loaded thereon moves away from the loading machine 20 so that the distance between the loading machine 20 and the transport vehicle 10 is greater than the threshold value DS. Thus, at time t7 after time t6, the construction management system 100 performs a process illustrated in FIG. 6.

Figure 6:
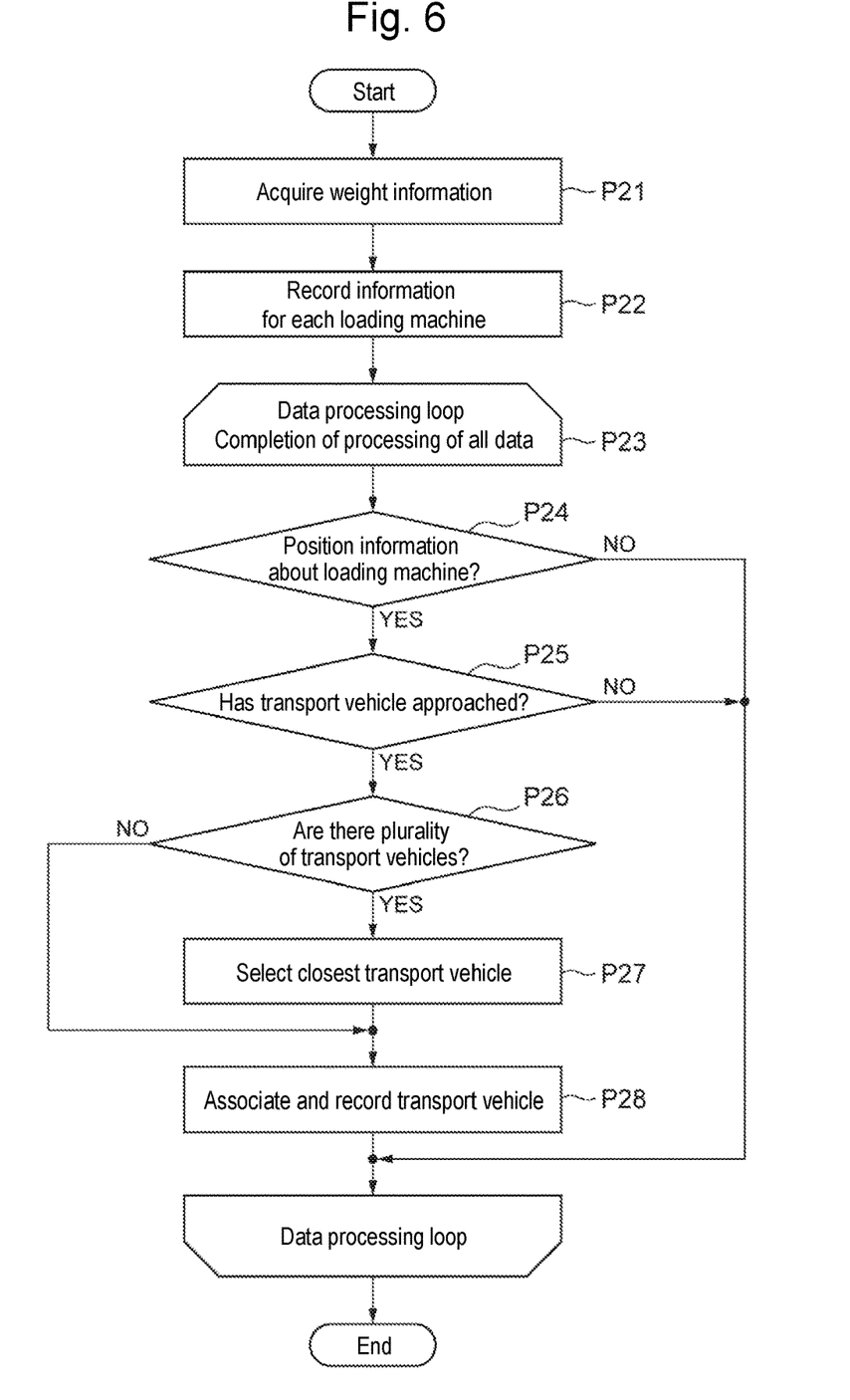
FIG. 6 is a flowchart showing the flow of processing of the position information server of FIG. 1.

FIG. 6 is a flow diagram illustrating the flow of a process of the position information server 131 of the information management controller 130 included in the construction management system 100 of FIG. 1. In a process P21, the position information server 131, for example, receives the weight information transmitted from the transmitting device 132d of the weight information server 132, using the receiving device 131a. Then, the construction management system 100 performs, using the processing device 131b of the position information server 131, for example, a process P22 for recording information for each loading machine 20.

In the process P22, the processing device 131b of the position information server 131, for example, causes the weight information input from the receiving device 131a to be stored in the storage device 131c as chronological information of the weight information about each loading machine 20, together with identifying information (ID), such as a user name, of the loading machine 20 and the time of measurement of weight. After the end of the process P22, the construction management system 100 performs a data processing loop P23 for weight information.

In the data processing loop P23, the processing device 131b initially determines whether, as an ending condition, the processing of the weight information about all the loading machines 20 stored in the storage device 131c is completed. If the processing of the weight information about all the loading machines 20 stored in the storage device 131c is completed, the processing device 131b ends the process illustrated in FIG. 6. If the processing is not completed with respect to any of the weight information stored in the storage device 131c, the processing device 131b performs a process P24 for searching for the position information about the loading machine 20 stored in the storage device 131c.

In the process P24, the processing device 131b searches for the position information about the loading machine 20 stored in the storage device 131c. If, as a result of the search in the process P24, there is no position information about the loading machine 20 within a predetermined range of time (NO), the processing device 131b again performs the data processing loop P23 for the weight information. On the other hand, if, as a result of the search in the process P24, there is position information about a loading machine 20 within the predetermined time, a process P25 for determining loading onto the transport vehicles 10 by the loading machine 20 is performed.

Figure 7:
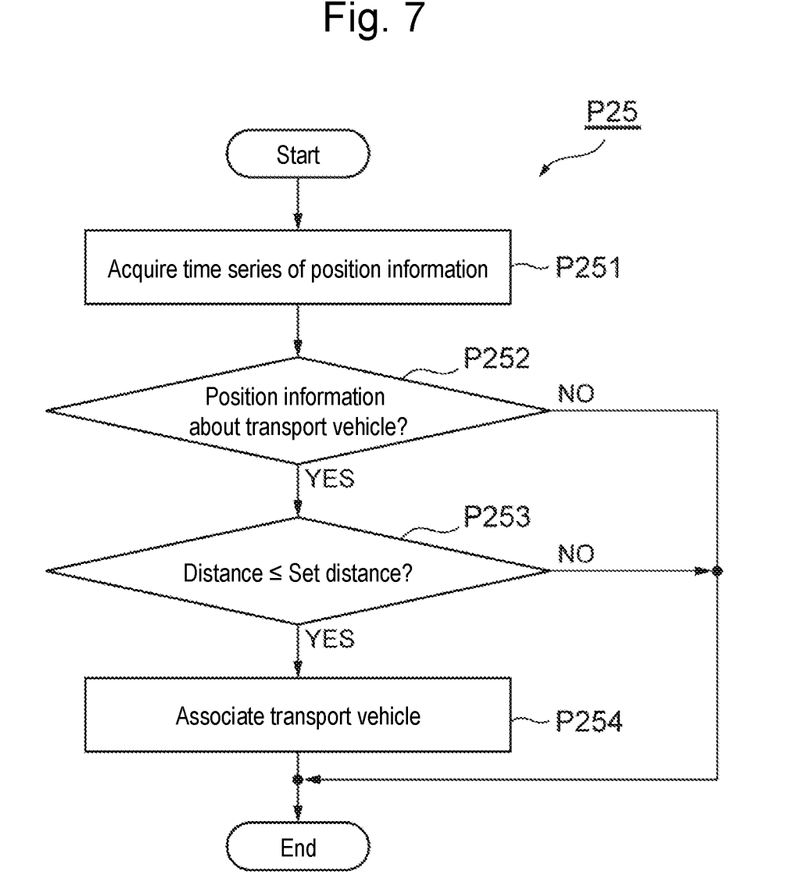
FIG. 7 is a flowchart showing the details of processing for determining the approach of a transport vehicle of FIG. 6.

FIG. 7 is a flow diagram illustrating the details of the loading determination process P25 of FIG. 6. First, in a process P251, the processing device 131b reads from the storage device 131c the chronological information of the position information about the loading machine 20 and the chronological information of the position information about the transport vehicles 10. Then, in a process P252, the processing device 131b searches for the position information about the transport vehicles 10 in a predetermined range of time. In the process P252, if there is no position information about the transport vehicles 10 (NO), the processing device 131b ends the process P25 and returns to the end determination of the data processing loop P23 of FIG. 6. On the other hand, if there is the position information about the transport vehicles 10 in the process P252 (YES), the processing device 131b performs a process P253.

In the process P253, the processing device 131b, based on the chronological information of the position information about the loading machine 20 and the chronological information of the position information about the transport vehicles 10, calculates the distance between the loading machine 20 and the transport vehicles 10 at each time. Further, the processing device 131b determines whether the calculated distance is less than or equal to a set distance, such as the distance threshold value DS. If, as a result of the determination, the calculated distance is greater than the set distance (NO), the processing device 131b ends the process P25 and returns to the end determination of the data processing loop P23 of FIG. 6. On the other hand, if, as a result of the determination, the calculated distance is less than or equal to the set distance (YES), the processing device 131b performs a process P254.

In the process P254, the processing device 131b associates, as the transport vehicle 10 for loading, the transport vehicle 10 of which the distance from the loading machine 20 is less than or equal to the set distance, i.e., the threshold value DS, with the position information about the loading machine 20. The processing device 131b then ends the process P25 and performs a process P26 of FIG. 6.

In the process P26, the processing device 131b determines whether, as a result of the process P25, a plurality of transport vehicles 10 are associated as the transport vehicle 10 for loading by the loading machine 20. If, as a result of the determination, a plurality of transport vehicles 10 are associated as the object for loading by one loading machine 20 (YES), the processing device 131*b* performs a process P27 for recording in the storage device 131*c* the transport vehicle 10 closest to the loading machine 20 as the object for loading and the other transport vehicles 10 as not the object for loading. After the end of the process P27, the processing device 131*b* performs a process P28. On the other hand, if, as a result of the determination in the process P26, one transport vehicle 10 is associated as the object for loading by the one loading machine 20 (NO), the processing device 131*b* performs the process P28.

With reference now to FIG. 4, from time t2 to time t6, one transport vehicle 10 has approached one loading machine 20 at a distance less than or equal to the threshold value DS. Thus, in the process of the position information server 131 at time t7, the processing device 131*b*, based on a negative determination result (NO) in the process P26, proceeds to the process P28. Meanwhile, between time t8 and time t10, two transport vehicles 10 have approached at distances less than or equal to the threshold value DS after time t9. Accordingly, in the process of the position information server 131 at time t11, the processing device 131*b*, based on a positive determination result (YES) in the process P26, proceeds to the process P27, associates one closest transport vehicle 10 as the object for loading by the loading machine 20, and proceeds to the process P28.

In the process P28, the processing device 131*b* records in the storage device 131*c* the transport vehicle 10 that has been associated as the object for loading by the loading machine 20, in association with the weight information about the loading machine 20. Thereafter, the processing device 131*b* repeatedly performs the data processing loop P23 until data processing of all weight information stored in the storage device 131*c* ends. When the data processing of all the weight information stored in the storage device 131*c* ends, the processing device 131*b* ends the process of FIG. 6.

Figure 8:
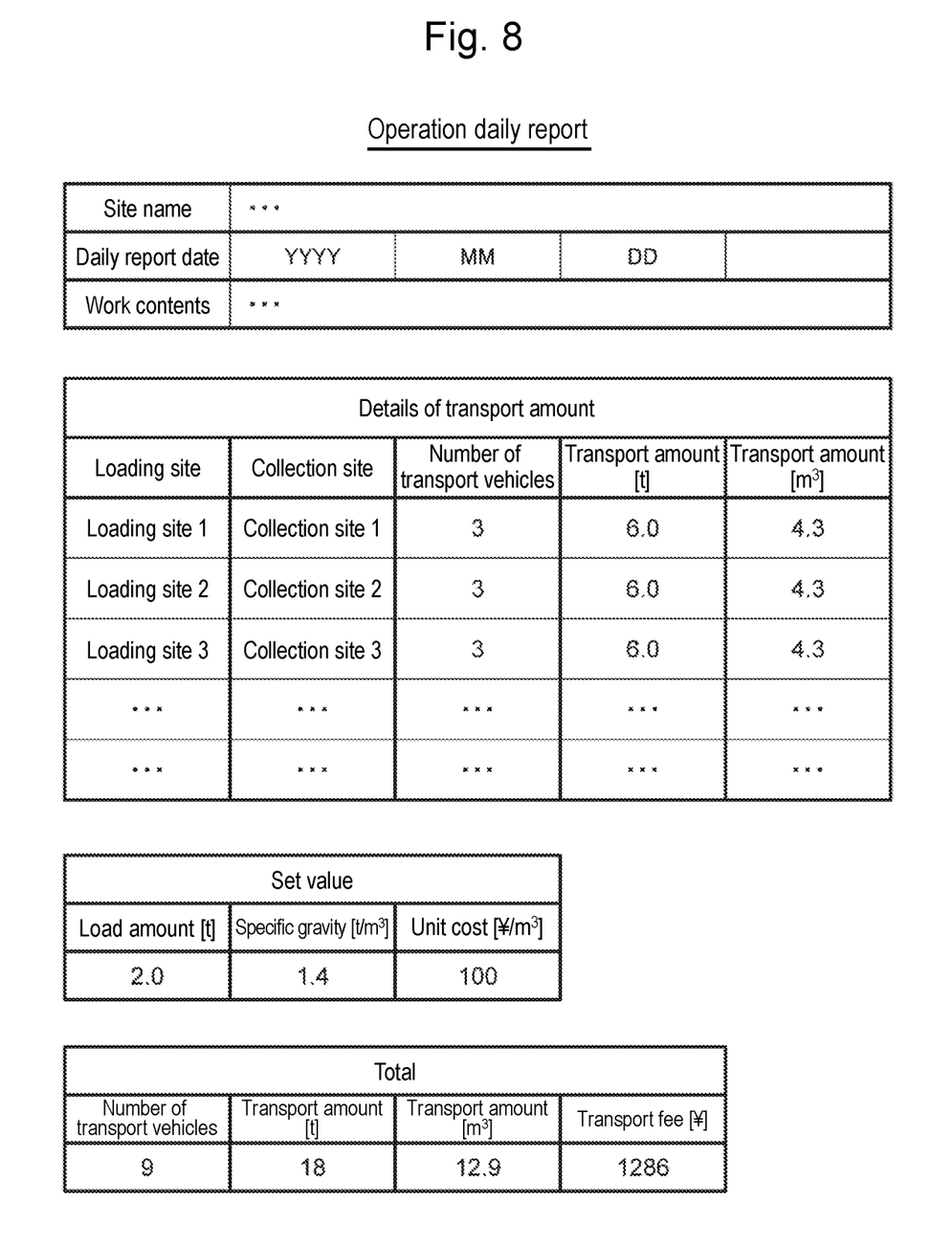
FIG. 8 illustrates an example of an operation daily report output by a user server of FIG. 1.

FIG. 8 illustrates an example of the operation daily report output by the user server 133 illustrated in FIG. 1. As illustrated in FIG. 1, the weight information about the loading machine 20 associated with the transport vehicle 10 for loading in the position information server 131 is transmitted to the user server 133 via the transmitting device 131*d*, and received by the receiving device 133*a* of the user server 133. The receiving device 133*a* outputs the received information to the processing device 131*b*. The processing device 131*b* calculates operation daily report data based on the information input from the receiving device 133*a* and the information stored in the storage device 133*c*, and outputs the calculated data to the output device 133*d*. The output device 133*d* outputs the operation daily report as illustrated in FIG. 8, based on the operation daily report data input from the processing device 133*b*.

As described above, the construction management system 100 of the present embodiment is provided with the position sensor 16*a* as a transport vehicle position detection device, the position sensor 26 as a loading machine position detection device, the weight detection device 120, and the information management controller 130. The position sensor 16*a* detects the position information about the transport vehicle 10 that transports a payload. The position sensor 26 detects the position information about the loading machine 20 that loads the payload onto the transport vehicle 10. The weight detection device 120 detects the weight information about the payload held by the loading machine 20. The information management controller 130, based on the chronological information of the position information about the transport vehicle 10, the chronological information of the position information about the loading machine 20, and the chronological information of the weight information, calculates the load weight of the payload loaded onto the transport vehicle 10.

This configuration makes it possible for the construction management system 100 to ascertain information about the construction site more accurately than before. Specifically, in the case of the conventional construction system described in Patent Literature 1, the total amount of load transported from the construction site cannot be accurately ascertained because no loading work may be actually performed even when the loading machine and the transport vehicle have approached each other.

In contrast, in the construction management system 100 of the present embodiment, the weight information about the payload held by the loading machine 20 is detected when the payload is loaded onto the transport vehicle 10. Further, in the construction management system 100 of the present embodiment, the load weight of the payload loaded onto the transport vehicle 10 is calculated based on the chronological information of the position information about the transport vehicle 10, the chronological information of the position information about the loading machine 20, and the chronological information of the weight information. Thus, even if no loading work has been performed although the transport vehicle 10 and the loading machine 20 approached each other, that fact can be accurately ascertained, so that the total amount of load transported from the construction site by the transport vehicle 10 can be more accurately ascertained.

Further, in the construction management system 100 of the present embodiment, the information management controller 130, based on the position information about the collection site where the payload transported by each transport vehicle 10 is unloaded or dumped, the chronological information of the position information about the transport vehicle 10, and the load weight, the integrated value of the weight of the payload unloaded by the transport vehicle 10 onto the collection site is calculated. This configuration facilitates the creation of the operation daily report including the integrated value of the weight of the payload unloaded by the transport vehicle 10 onto the collection site, thus reducing a burden on the user.

Further, in the construction management system 100 of the present embodiment, the information management controller 130, based on the position information about the collection site where the payload transported by the transport vehicle 10 is unloaded or dumped, the chronological information of the position information about the transport vehicle 10, and the load weight, the travelling time of the transport vehicle 10 from the loading position where the payload is loaded onto the transport vehicle 10 to the collection site is calculated. This configuration facilitates the creation of the operation daily report including the travelling time of the transport vehicle 10 from the loading position where the payload is loaded onto the transport vehicle 10 to the collection site, thus reducing a burden on the user.

Moreover, in the construction management system 100 of the present embodiment, the information management controller 130, based on the position information about the collection site where the payload transported by each transport vehicle 10 is unloaded or dumped, the chronological information of the position information about the transport vehicle 10, and the load weight, the number of times of movement of the transport vehicle 10 from the loading position where the payload is loaded onto the transport vehicle 10 to the collection site is calculated. This configuration facilitates the creation of the operation daily report including the number of times of movement of the transport vehicle 10 from the loading position where the payload is loaded onto the transport vehicle 10 to the collection site, thus reducing a burden on the user.

Further, in the construction management system 100 of the present embodiment, the information management controller 130, based on the information about the position of a plurality of collection sites where the payload transported by each transport vehicle 10 is unloaded or dumped, the chronological information of the position information about the transport vehicle 10, and the load weight, calculates the operating time at each collection site, the number of times of movement of the transport vehicle from the loading position where the payload is loaded onto the transport vehicle to each collection site, and the total weight of the payload unloaded at each collection site. This configuration facilitates the creation of the operation daily report including the operating time at each collection site, the number of times of movement of the transport vehicle from the loading position where the payload is loaded onto the transport vehicle to each collection site, and the total weight of the payload unloaded at each collection site, thus reducing a burden on the user.

Further, in the construction management system 100 of the present embodiment, the position detection module 110 includes the position sensor 16a as a transport vehicle position detection device, the position sensor 26 as a loading machine position detection device, and the communication device 16b and the communication device 27c. The position sensor 16a detects the position information about each transport vehicle 10. The position sensor 26 detects the position information about the loading machine 20. The communication device 16b transmits the position information about the transport vehicle 10 detected by the position sensor 16a to the information management controller 130. The communication device 27c transmits the position information about the loading machine 20 detected by the position sensor 26 to the information management controller 130. This configuration allows the information management controller 130 to acquire the chronological information of the position information about each transport vehicle 10 and the chronological information of the position information about each loading machine 20.

Further, in the construction management system 100 of the present embodiment, the weight detection device 120 includes the hydraulic sensor 25s, the attitude sensors 23s, the processing device 27a, and the communication device 27c. The hydraulic sensor 25s measures the oil pressure of the hydraulic cylinder 25a for driving the work assembly 23 of the loading machine 20. The attitude sensors 23s detect the attitude of the work assembly 23. The processing device 27a, based on the oil pressure and attitude detected by the hydraulic sensor 25s and the attitude sensors 23s, calculates the weight of the payload held by the work assembly 23. The communication device 27c transmits weight information that is the information about the weight calculated by the processing device 27a to the information management controller 130. This configuration allows the information management controller 130 to receive the weight information from each loading machine 20 and to acquire the chronological information of the weight information about each loading machine 20.

Further, in the construction management system 100 of the present embodiment, the information management controller 130 includes the position information server 131, the weight information server 132, the storage device 131c, and the processing device 133b. The position information server 131 receives the position information about each transport vehicle 10 and the position information about the transport vehicles 10 from the position detection module 110. The weight information server 132 receives the weight information from the weight detection device 120. The storage device 131c stores the position information about the transport vehicles 10, the position information about the loading machine 20, and the weight information. The processing device 133b calculates the load weight of the transport vehicle 10. This configuration allows the construction management system 100 to ascertain information about the construction site more accurately than before.

As described above, according to the present embodiment, it is possible to provide the construction management system 100 capable of ascertaining information about a construction site more accurately than before.

While an embodiment of the construction management system according to the present disclosure has been described in detail with reference to the drawings, concrete configurations of the construction management system are not limited to the embodiment, and any design changes and the like within the spirit and scope of the present disclosure are included in the present disclosure.

REFERENCE SIGNS LIST

10 Transport vehicle
16a Position sensor (transport vehicle position detection device)
16b Communication device
20 Loading machine
23 Work assembly
23s Attitude sensor
25a Hydraulic cylinder
25s Hydraulic sensor
26 Position sensor (loading machine position detection device)
27a Processing device
27c Communication device
100 Construction management system
120 Weight detection device
130 Information management controller
131 Position information server
131c Storage device
132 Weight information server
133b Processing device

The invention claimed is:

1. A construction management system comprising:
a transport vehicle position detection device, including a first sensor, which detects position information about a transport vehicle for transporting a payload;
a loading machine position detection device, including a second sensor, which detects position information about a loading machine for loading the payload onto the transport vehicle;
a weight detection device which detects weight information about the payload held by the loading machine; and
an information management controller which, based on chronological information of the position information about the transport vehicle, chronological information of the position information about the loading machine, and chronological information of the weight information, calculates a load weight of the payload loaded onto the transport vehicle,
wherein the information management controller includes:

a storage device where the chronological information of the position information about the transport vehicle, the chronological information of the position information about the loading machine, and the chronological information of the weight information about the payload held by the loading machine is recorded; and a processing device configured to:

repeatedly acquire the weight information about the payload held by the loading machine detected by the weight detection device on a predetermined periodic basis when a distance between the loading machine and the transport vehicle is less than or equal to a threshold value, end acquiring the weight information if the distance is greater than the threshold value, and store the weight information in the storage device;

based on the chronological information of the position information about the transport vehicle and the chronological information of the position information about the loading machine, associate, as an associated transport vehicle for loading, one closest transport vehicle among transport vehicles of which the distance from the loading machine is less than or equal to the threshold value at each time;

record in the storage device the associated transport vehicle in association with the weight information about the loading machine, and repeatedly perform recording the associated transport vehicle until data processing of all weight information stored in the storage device is completed; and calculate the load weight of the payload loaded onto the transport vehicle by the weight information recorded in association with the associated transport vehicle for loading.

2. The construction management system according to claim 1, wherein the information management controller, based on position information about a collection site where the payload transported by the transport vehicle is dumped, the chronological information of the position information about the transport vehicle, and the load weight calculated by the information management controller, calculates an integrated value of the weight of the payload dumped by the transport vehicle at the collection site.

3. The construction management system according to claim 1, wherein the information management controller, based on position information about a collection site where the payload transported by the transport vehicle is dumped, the chronological information of the position information about the transport vehicle, and the load weight calculated by the information management controller, calculates a moving time of the transport vehicle from a loading position where the payload is loaded onto the transport vehicle to the collection site.

4. The construction management system according to claim 1, wherein the information management controller, based on position information about a collection site where the payload transported by the transport vehicle is dumped, the chronological information of the position information about the transport vehicle, and the load weight calculated by the information management controller, calculates a number of times of movement of the transport vehicle from a loading position where the payload is loaded onto the transport vehicle to the collection site.

5. The construction management system according to claim 1, wherein the information management controller, based on position information about a plurality of collection sites where the payload transported by the transport vehicle is dumped, the chronological information of the position information about the transport vehicle, and the load weight calculated by the information management controller, calculates an operating time at each of the plurality collection sites, a number of times of movement of the transport vehicle from a loading position where the payload is loaded onto the transport vehicle to each of the plurality collection sites, and a total weight of the payload dumped at each of the plurality collection sites.

\* \* \* \* \*